United States Patent
Szyndelman et al.

(10) Patent No.: US 12,234,380 B2
(45) Date of Patent: *Feb. 25, 2025

(54) MECHANICALLY ALLOYED METALLIC THERMAL SPRAY COATING MATERIAL AND THERMAL SPRAY COATING METHOD UTILIZING THE SAME

(71) Applicant: OERLIKON METCO (US) INC., Westbury, NY (US)

(72) Inventors: Gregory Szyndelman, Villigen (CH); Scott Wilson, Zurich (CH)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/298,426

(22) PCT Filed: Dec. 12, 2019

(86) PCT No.: PCT/US2019/066049
§ 371 (c)(1),
(2) Date: May 28, 2021

(87) PCT Pub. No.: WO2020/123848
PCT Pub. Date: Jun. 18, 2020

(65) Prior Publication Data
US 2022/0025289 A1    Jan. 27, 2022

Related U.S. Application Data

(60) Provisional application No. 62/779,227, filed on Dec. 13, 2018.

(51) Int. Cl.
C09D 5/08 (2006.01)
B22F 1/102 (2022.01)
(Continued)

(52) U.S. Cl.
CPC .............. C09D 5/084 (2013.01); B22F 1/102 (2022.01); C10M 103/04 (2013.01);
(Continued)

(58) Field of Classification Search
CPC .............. C10M 103/06; C10M 107/32; C10M 103/04; C10M 111/04; C10M 2209/1023;
(Continued)

(56) References Cited

U.S. PATENT DOCUMENTS 3,591,362 A * 7/1971 Benjamin ............... C22C 33/02
241/27
3,723,165 A 3/1973 Longo et al.
(Continued)

FOREIGN PATENT DOCUMENTS

CN 108220860 6/2018
EP 2 158 338 3/2010
(Continued)

OTHER PUBLICATIONS

Buckley et al., "The metal-to-metal interface and its effect on adhesion and friction," *Journal of Colloid and Interface Science*, 58 (1), p. 36-53, Jan. 1977.
(Continued)

*Primary Examiner* — Vishal V Vasisth
(74) *Attorney, Agent, or Firm* — GREENBLUM & BERNSTEIN, P.L.C.

(57) ABSTRACT

Thermal spray coating obtained from a thermal spray powder material containing at least one of Aluminum-containing particles, Magnesium-containing particles, and Titanium-containing particles mechanically alloyed to a transition metal. The coating includes Aluminum, Magnesium, or Titanium alloy portions alloyed to the transition metal. The
(Continued)

thermal spray powder is obtained of Aluminum, Magnesium, or Titanium containing particles mechanically alloyed to a transition metal.

28 Claims, 4 Drawing Sheets

(51) Int. Cl.
  *C10M 103/04* (2006.01)
  *C10M 103/06* (2006.01)
  *C10M 107/32* (2006.01)
  *C10M 111/04* (2006.01)
  *C23C 4/06* (2016.01)
  *C10N 30/06* (2006.01)
  *C10N 50/08* (2006.01)
  *C10N 70/00* (2006.01)

(52) U.S. Cl.
  CPC ........ *C10M 103/06* (2013.01); *C10M 107/32* (2013.01); *C10M 111/04* (2013.01); *C23C 4/06* (2013.01); *B22F 2301/052* (2013.01); *B22F 2301/058* (2013.01); *B22F 2301/205* (2013.01); *B22F 2304/10* (2013.01); *C10M 2201/053* (2013.01); *C10M 2201/1033* (2013.01); *C10M 2209/1023* (2013.01); *C10N 2030/06* (2013.01); *C10N 2050/08* (2013.01); *C10N 2070/00* (2013.01)

(58) Field of Classification Search
  CPC ..... C10M 2201/1033; C10M 2201/053; B22F 1/16; B22F 9/04; B22F 2304/10; B22F 2301/052; B22F 2301/058; B22F 2301/205; C09D 5/084; C09D 167/00; C23C 4/06; C08K 2003/0881; C08K 2201/005; C08K 9/02; C08K 3/04; C08K 3/08; C08K 2003/0812; C08K 3/346; C08K 2003/162; C08K 2003/3009; C08K 2003/385; C10N 2070/00; C10N 2050/08; C10N 2030/06

See application file for complete search history.

(56) References Cited

U.S. PATENT DOCUMENTS

| | | | |
|---|---|---|---|
| 4,578,115 A | | 3/1986 | Harrington et al. |
| 5,063,021 A | | 11/1991 | Anand et al. |
| 5,169,461 A | * | 12/1992 | Watwe ............... C22C 32/0036 148/438 |
| 5,196,471 A | * | 3/1993 | Rangaswamy ........... C23C 4/04 428/404 |
| 5,506,055 A | | 4/1996 | Dorfman et al. |
| 5,631,004 A | | 5/1997 | Cagle et al. |
| 5,631,044 A | * | 5/1997 | Rangaswamy ........... C23C 4/08 427/217 |
| 8,609,187 B1 | * | 12/2013 | Kang ...................... C23C 24/04 427/427 |
| 2003/0180565 A1 | | 9/2003 | Herbst-Dederichs |
| 2004/0208775 A1 | * | 10/2004 | Bouaricha ............... B22F 1/148 419/66 |
| 2009/0004503 A1 | | 1/2009 | Freling et al. |
| 2013/0186237 A1 | | 7/2013 | Christopherson, Jr. et al. |
| 2014/0234654 A1 | | 8/2014 | Refke et al. |
| 2016/0076128 A1 | | 3/2016 | Sordelet et al. |
| 2016/0251975 A1 | | 9/2016 | Strock et al. |

FOREIGN PATENT DOCUMENTS

| | | |
|---|---|---|
| JP | 2006-241514 | 9/2006 |
| JP | 7377201 | 10/2023 |
| WO | 2001/044533 | 6/2001 |
| WO | 2009/002680 | 12/2008 |
| WO | 2019/118708 | 6/2019 |

OTHER PUBLICATIONS

Buckley et al., "Tribological properties of surfaces," *Thin Solid Films*, 53 (3), p. 271-283, Sep. 1978.
Miyoshi et al., "Tribological properties of Silicon carbide in the metal removal process," *Wear*, 82 (2), p. 197-211, Nov. 1982.
Miyoshi et al., "Adhesion and friction of transition metals in contact with non-metallic hard materials," *Wear*, 77, Issue 2, Apr. 1982, pp. 253-264.
S. Wilson, "Thermally sprayed abradable coating technology for sealing in gas turbines," *The Future of Gas Turbine Technology*, 6th International Conference, Oct. 17-18, 2012, Brussels, Belgium, Paper ID No. 51.
R.J. Rodriguez et al., *Vacuum* vol. 52, Issues 1-2, Jan. 1, 1999, pp. 187-192 "Tribological properties of ion implanted Aluminum alloys."
J.R. Davis, "Material Production Techniques for Producing Unique Geometries of Compositions," *Handbook of Thermal Spray Technology ASM International*, 2004, p. 157.
M. Laribi et al., "Study of mechanical behavior of Molybdenum coating using sliding wear and impact tests," *Wear* vol. 262, Issues 11-12, May 10, 2007, pp. 1330-1336.
Rigney, "Transfer, mixing and associated chemical and mechanical processes during the sliding of ductile materials," *Wear*, 245 (2000) pp. 1-9.
T.S. Srivatsan et al., "The microstructure and hardness of Molybdenum powders consolidated by plasma pressure compaction," *Powder Technology* 114, 2001. 136-144.
J. Ahn et al., "Improvement of Wear Resistance of Plasma-Sprayed Molybdenum Blend Coatings," Journal of Thermal Spray Technology, vol. 14(2) Jun. 2005.
S. Tailor et al., "High-Performance Molybdenum Coating by Wire-HVOF Thermal Spray Process," *J Therm Spray Tech*, Apr. 2018, vol. 27, Issue 4, pp. 757-768.
M. Zdujic et al., "Intermetallic phases produced by the heat treatment of mechanically alloyed Al—Mo powders," *Materials Science and engineering*, A185 (1994) 77-86.
W.C. Rodrigues et al., "A Study of Al—Mo Powder Processing as a Possible Way to Corrosion Resistant Aluminum-Alloys," *Materials Research*, vol. 12, No. 2, 211-218, 2009.
A.H. Seikh et al., "The influence of transition metals addition on the corrosion resistance of nanocrystalline Al alloys produced by mechanical alloying."
W.C. Moshier et al., "Corrosion Behavior of Aluminum-Molybdenum Alloys in Chloride Solutions."
T. Tsuda et al., "Electrodeposition of Al-Mo Alloys from the Lewis Acidic Aluminum Chloride-1-ethyl-3-methylimidazolium Chloride Molten Salt," *2004 The Electrochemical Society*.
M.A. Jakab et al., "Cerium, Cobalt and Molybdate Cation Storage States, Release and Corrosion Inhibition when delivered from Al-Transition Metal-Rare Earth Metal Alloys."
Emge et al., "The effects of sliding velocity and sliding time on nanocrystalline tribolayer development and properties in copper," Wear, 267 (2009) pp. 562-567.
Rigney et al., "The Evolution of Tribomaterial During Sliding: A Brief Introduction," Tribol Lett 39 (2010) pp. 3-7.
Oñate et al., "Improvement of tribological properties by ion implantation," *Thin Solid Films*, 317 (1998) pp. 471-476.
Int'l Search Report (Form PCT/ISA/210) conducted in Int'l Appln. No. PCT/US2019/066049 (Mar. 9, 2020).
Int'l Written Opinion (Form PCT/ISA/237) conducted in Int'l Appln. No. PCT/US2019/066049 (Mar. 9, 2020).
Europe Search Report/Office Action conducted in counterpart Europe Appln. No. EP 19 89 4460 (Jul. 27, 2022).
Suryanarayan Cury, "Mechanical alloying and milling," *Mechanical Alloying and Milling*, CRC Press, XP55943556, ISBN: 978-0-429-21526-1, pp. 1-184 (Dec. 31, 2001).
Cinca et al., "Thermal spraying of transition metal aluminides: An overview," *Intermetallics*, Elsevier Science Publ. B.V, GB, vol. 24,

(56) References Cited

OTHER PUBLICATIONS

XP028467819, ISBN: 0966-9795, DOI: 10.1016/J.INTERMET. 2012.01.020, pp. 60-72 (Feb. 21, 2012).
Cinca et al., "An overview of intermetallics research and application: Status of thermal spray coatings," *Journal of Materials Research and Technology*, vol. 2, No. 1, XP55943520, BR, ISSN: 2238-7854, DOI: 10.1016/j.jmrt.2013.03.013, pp. 75-86 (Dec. 31, 2013).
China Search Report conducted in counterpart China Appln. No. 201980078896.6 (Nov. 22, 2022).
China Office Action Report conducted in counterpart China Appln. No. 201980078896.6 (Nov. 22, 2022).
Japan Office Action Report conducted in counterpart Japan Appln. No. 2021-530890 (Sep. 29, 2023).
Japan Office Action Report conducted in counterpart Japan Appln. No. 2021-530890 (May 15, 2024).

* cited by examiner

MECHANICALLY ALLOYED METALLIC THERMAL SPRAY COATING MATERIAL AND THERMAL SPRAY COATING METHOD UTILIZING THE SAME

PRIORITY TO RELATED APPLICATION

This application is a U.S. National Stage of PCT/US2019/066049 filed Dec. 12, 2019 and claims priority to U.S. Provisional Application No. 62/779,227, filed on Dec. 13, 2018, the disclosures of which being incorporated herein by reference in their entireties.

BACKGROUND

Field of the Disclosure

Example embodiments of this disclosure generally relate to a metal-based thermal spray coating with improved sliding and wear properties, and to a coating method of the spray coating.

Background Information

Thermal spraying is a coating process in which melted or heated materials are sprayed onto a surface. The feedstock, or coating precursor, may be heated by electrical processes, e.g., plasma or arc, or by chemical processes, e.g., combustion flame. Thermal spraying, also referred to as spray welding, consists of a heat source and a coating material in a powder or wire form which is melted into tiny droplets by the heat source and sprayed onto surfaces. Spray weld is also referred to as Plasma Spray, High Velocity Oxyfuel (HVOF), Arc Spray, Flame Spray, and Metalizing. Thermal sprayed coatings can be applied to metal or non-metal substrates.

Thermal spraying can provide thick coatings over a large area at high deposition rate as compared to other coating processes such as electroplating. Coating materials available for thermal spraying may include metals, alloys, ceramics, plastics and composites.

SUMMARY

Thermal spray coating materials are generally metallic and/or ceramic powder materials. Some of these powder materials offer wear- and corrosion-resistance when used to form thermal spray coatings. Corrosion of coating materials can be observed by the presence of chlorides as well as of galvanic couples in the case of materials such as steel, stainless steels, Titanium alloys, and nickel alloys. Common corrosion types include galvanic corrosion, stress corrosion cracking, atmospheric corrosion, and aqueous corrosion, all of which can lead to catastrophic failures such as coating blistering, and spallation. Wear damage may arise, for example, from excessive frictional forces (high coefficient of friction) and frictional heating. The damage can take the form of metal transfer and scuffing, extreme bulk plastic deformation, and even fracture. Mechanical alloying of metallic powder with transition metals is often used to manufacture parts via sintering consolidation treatments. The use of mechanical alloying of transition metals allows for an increase in the concentration of such transition elements in, for example, Aluminum alloys, Magnesium alloys, or Titanium alloys, which can produce a de-facto solid solution.

Blending of powder particles includes compressing the metal powders while being restricted in, e.g., a die under pressure, where a base metal or alloy, any additional elements and/or a powdered lubricant are fed into a blender where these materials are blended into a mixture. Cladding of powder particles involves the addition of a functional layer (or multiple layers) of a separate material onto another core material. Those layers can be fine powder particles bonded together onto the core by a binder (organic or inorganic), or they can be electrolytically or chemically (e.g. chemical vapor deposition—CVD) or physically (plasma vapor deposition—PVD) deposited.

Ball milling is a grinding method that grinds a material into a powder. During the ball milling process, repeated collisions are generated between the material and small rigid balls of ceramic, flint pebbles and/or stainless steel in a concealed container to generate localized pressure that breaks down the material into the powder.

Mechanical alloying is a solid-state and powder processing technique involving repeated cold welding, fracturing, and re-welding of blended powder particles in, e.g., a high-energy ball mill to produce a material, e.g., a homogeneous material. Mechanical alloying may also be performed via attrition milling, which includes mechanically reducing the size of solid particles by intense agitation of a slurry of material being milled and coarse milling media, or cryomilling, which includes cooling a material and subsequently reducing the size of the material to, e.g., a powder.

Aluminum alloy-based powder coatings may include, for example, abradable powder coating materials such as METCO® 601NS, which includes Aluminum (Al) with 7 percent Silicon (Si) and 40 percent polyester, and METCO® 320NS, which includes Aluminum (Al) with 10 percent Silicon (Si) and 20 percent hexagonal boron nitride (hBN). Aluminum alloy-based thermal spray powders to produce abradable coatings for clearance control applications may be used when, e.g., a rotating component comes into contact with the coating as a result of design intent or operational surges. Such coatings may be useful to minimize the wear to the rotating components while maximizing gas path efficiency by providing clearance control in seal areas. Such coatings may combine desired properties of polymeric materials such as soft shearable and heat-resistant polyesters with higher strength shearable alloys (e.g. METCO® 601NS or M610NS which is Al-bronze+polyester). Another coating concept combines Al-Si with hBN where the ceramic hBN phase facilitates cutting performance and boosts temperature resistance (METCO® 320NS). These coatings are suited for rub incursions against either steel, nickel alloy or Titanium alloy compressor blades, knives or labyrinth seal strips. Abradable coatings with Aluminum alloy matrices may, however, be susceptible to general corrosion (white Aluminum hydroxide generation), cyclic corrosion, blistering corrosion as well as stress-corrosion cracking damages, when exposed to sea salt and moisture laden environments.

There is a need for a metal-based thermal spray coating with improved sliding and wear properties that is obtained from a thermal spray powder that includes one or more transition metals, e.g., Molybdenum or Molybdenum and Chromium, mechanically alloyed to a metal-based material such as Aluminum or Aluminum alloy, Magnesium or Magnesium alloy, Titanium or Titanium alloy; or a coating method that uses the powder.

In light of the above described problems and unmet needs, example embodiments include an Aluminum-, Magnesium-, or Titanium-based thermal spray coating powder incorporating transition metals such as Mo, Cr, Zr, Ti, Si, or mixtures thereof, that have been mechanically alloyed with an Al, Mg, and/or Ti alloy component and that can be used to form an abradable coating that can advantageously exhibit improved wear and corrosion resistance.

Example embodiments relate to a thermal spray coating arrangement, the arrangement including a coating precursor including metal-containing particles mechanically alloyed to a transition metal, the metal-containing particles including at least one of Aluminum, Magnesium, and Titanium; and a thermal spray coating including at least one of Aluminum metal; a first alloy of Aluminum and the transition metal; Magnesium metal; a second alloy of Magnesium and the transition metal; Titanium metal; and a third alloy Titanium and the transition metal. Each of the metal-containing particles may include a metal core surrounded by the transition metal mechanically alloyed to the metal core. The metal-containing particles are blended, mixed, or clad with an organic material, and/or the metal-containing particles are blended, mixed, or clad with an inorganic solid lubricant.

Example embodiments relate to a thermal spray coating that includes metal-containing particles mechanically alloyed to a transition metal, the metal-containing particles including at least one of Aluminum, Magnesium, and Titanium. In example embodiments at least a portion of the Aluminum-containing particles, Magnesium-containing particles, and Titanium-containing particles is not alloyed to the transition metal.

Example embodiments relate to a thermal spray coating including metal-containing particles alloyed to a transition metal, the metal-containing particles including at least one of Aluminum, Magnesium, and Titanium. In other example embodiments, the thermal spray coating includes at least one of Aluminum or Aluminum alloy portions alloyed to the transition metal; Magnesium or Magnesium alloy portions alloyed to the transition metal; and Titanium or Titanium alloy portions alloyed to the transition metal.

Example embodiments relate to metal-based thermal spray coatings with improved sliding and wear properties, the coating being obtained from a thermal spray powder that includes one or more transition metals, e.g., Molybdenum and/or Chromium, that are mechanically alloyed to a metal-based material such as Aluminum or Aluminum alloy, Magnesium or Magnesium alloy, Titanium or Titanium alloy.

Example embodiments relate to a thermal spray powder including a mixture, a blend, or a clad of first particles of polymer; and second particles containing metal and Silicon, wherein an outer surface of the second particles are mechanically alloyed to a transition metal. The metal includes at least one of Aluminum, Titanium or Magnesium. The thermal spray powder includes a greater weight percentage of the second particles than the first particles.

Aluminum alloy-based abradable coatings obtained using mechanically alloyed transition metals and Aluminum alloy powder exhibit improved corrosion resistance, which is as an additional benefit. The thermal spraying of mechanically alloyed powder enhances the alloying of the sprayed powder such that the applied coating exhibits improved properties over current thermal spray coatings obtained out of atomized powder. This can apply as well to Magnesium alloy- or Titanium alloy-based abradable coatings.

Embodiments of the invention include a metal-based thermal spray coating with improved sliding and wear properties, wherein the coating material is obtained by mechanically alloying a metallic powder with one or more transition metals. Embodiments of the coating material include pure or alloyed Aluminum, e.g., 99% pure Aluminum, such as METCO® 54NS, or Aluminum with a purity greater than 98% or greater. In other examples, the purity can be either 90% or greater or 95% or greater. Embodiments of the transition metal or metals include Molybdenum, Chromium, Zirconium, Titanium, Silicon, and mixtures thereof. Embodiments of the coating material include pure or alloyed Titanium, e.g., 99% pure Titanium, or Titanium with a purity greater than 98% or greater. In other examples, the purity of Titanium may be 85% or greater (example of Ti6-2-4-2 or Ti 6-4 grade 5).

Example embodiments are also directed to a thermal spray coating obtained from a thermal spray powder material containing Aluminum-containing particles mechanically alloyed to a transition metal, the coating including Aluminum alloy portions alloyed to the transition metal. This can apply as well to Magnesium alloy- or Titanium alloy-based thermal spray coatings.

Example embodiments include the Aluminum-containing particles each having an Aluminum or Aluminum alloy core surrounded by the transition metal mechanically alloyed to the core. The thermal spray powder may include an organic material and/or an organic or inorganic solid lubricant blended or mixed with the Aluminum-containing particles. The Aluminum-containing particles may include a core of pure Aluminum. The Aluminum-containing particles may include a core of an Aluminum alloy. Other example embodiments include Magnesium-containing particles or Titanium-containing particles including a Magnesium, or Titanium (or Magnesium, or Titanium alloy) core surrounded by the transition metal mechanically alloyed to the core. The thermal spray powder may include an organic material or inorganic solid lubricant blended or mixed with the Magnesium, or Titanium containing particles. The Magnesium, or Titanium containing particles may include a core of pure Magnesium, or a core of pure Titanium, respectively. The Magnesium- or Titanium-containing particles may respectively include a core of a Magnesium alloy, or a core of Titanium alloy.

In example embodiments, the transition metal may be at least one of Molybdenum; Chromium; Zirconium; Titanium; Silicon; or mixtures thereof. The transition metal may be only Molybdenum. The transition metal may be only Chromium. The transition metal may be both Mo and Cr. The mechanically alloyed transition metal may have a particle size that is less than 50 μm (Fisher Model 95 Sub-Sieve Sizer (FSSS) measurement), or less than 10 μm (FSSS measurement), or less than 1 μm (FSSS measurement).

Example embodiments also include a thermal spray powder coating material containing Aluminum-containing particles, Magnesium-containing particles, or Titanium-containing particles, mechanically alloyed to a transition metal. In example embodiments, the Aluminum-containing particles each include an Aluminum or Aluminum alloy core surrounded by the transition metal mechanically alloyed to the core. The thermal spray powder may include an organic material or inorganic solid lubricant blended, mixed or clad with the Aluminum-containing particles. The Aluminum-containing particles may include a core of pure Aluminum. The Aluminum-containing particles may include a core of an Aluminum alloy.

In other example embodiments, the Magnesium-containing particles each include a Magnesium or Magnesium alloy core surrounded by the transition metal mechanically alloyed to the core. The thermal spray powder may include an organic material or solid lubricant blended, mixed or clad with the Magnesium-containing particles. The Magnesium-containing particles may include a core of pure Magnesium. The Magnesium-containing particles may include a core of a Magnesium alloy.

In further example embodiments, the Titanium-containing particles each include a Titanium or Titanium alloy core surrounded by the transition metal mechanically alloyed to the core. The thermal spray powder may include an organic material or solid lubricant blended, mixed or clad with the Titanium-containing particles. The Titanium-containing particles may include a core of pure Titanium. The Titanium-containing particles may include a core of a Titanium alloy.

In example embodiments, the Aluminum-containing particles, Magnesium-containing particles, or Titanium-containing particles may be blended or clad with 20 to 70 weight percent organic material. In other example embodiments, the Aluminum-containing particles, Magnesium-containing particles, or Titanium-containing particles may be blended or clad with 30 to 50 weight percent organic material. The type of organic material is not critical and may be, for example a polyester such as liquid crystal polyester, or polymer such as methyl methacrylate, or any other organic material that can be blended or clad with the above-discussed metal particles.

In further example embodiments, the Aluminum-containing particles, Magnesium-containing particles, or Titanium-containing particles may be blended or clad with 5 to 50 weight percent solid lubricant. The Aluminum-containing particles, Magnesium-containing particles, or Titanium-containing particles may be blended or clad with 15 to 25 weight percent solid lubricant. The solid lubricant may be at least one of hexagonal boron nitride (hBN), calcium fluoride, graphite, Talc, or Molybdenum disulfide.

Example embodiments also provide a method of coating a substrate with a thermal spray powder coating material described above, wherein the method includes thermal spraying the powder material onto the substrate, wherein the thermal spray method includes plasma spraying; HVOF spraying; combustion spraying, or arc wire spraying.

Example embodiments also provide a method of making the thermal spray powder coating material described above, wherein the method includes mechanically alloying a transition metal to powder particles containing at least one of Aluminum, Magnesium, Titanium. In embodiments, the transition metal may be Mo. The transition metal may be Cr. The transition metal may be both Mo and Cr. The transition may be any one of Zr, Ti, Si, and mixtures thereof. The mechanically alloyed transition metal may have a particle size that is less than 50 µm (FSSS measurement), or less than 10 µm (FSSS measurement), or less than 1 µm (FSSS measurement).

In example embodiments, the powder particle containing Aluminum, Magnesium, or Titanium may be blended or clad with organic material. The type of organic material is not critical. The powder particles may be blended or clad with, for example, a polyester such as a metal clad polyester, an aromatic polyester, or a liquid crystal polyester, methyl methacrylate, solid lubricant, metal clad solid lubricant, spray dried metal agglomerate, or any other organic material capable of being blended or clad with the metal particles. The powder particles may be blended, mixed, or clad with a solid lubricant.

Example embodiments also provide a thermal spray abradable coating obtained from a thermal spray powder material containing Aluminum, Magnesium, or Titanium containing particles mechanically alloyed to Mo, the coating including Aluminum alloy portions alloyed to the Mo. The particles may each include a core surrounded by the Mo metal mechanically alloyed to the core. The thermal spray powder material may include an organic material or solid lubricant blended or mixed or clad with the Aluminum-containing particles.

Example embodiments also provide a thermal spray powder abradable coating material including Aluminum-, Magnesium- or Titanium-containing particles mechanically alloyed to Mo. The particles may each include an Al, Mg, or Ti alloy core surrounded by the Mo metal mechanically alloyed to the core. The thermal spray powder abradable coating material may include an organic material or solid lubricant blended or mixed or clad with the Al, Mg, or Ti alloy particles.

Example embodiments also include a thermal spray powder coating material containing Aluminum-, Magnesium- or Titanium-containing particles mechanically alloyed to a transition metal that is either Mo, or Mo and Cr. In example embodiments, the particles each include a Al, Mg, or Ti alloy core surrounded by the transition metal mechanically alloyed to the core. The thermal spray powder may also include Si pre-alloyed, blended, mixed, or clad with the Aluminum-, Magnesium- or Titanium-containing particles. The powder composition may be one of the items listed as Component A on Table B described below. The powder compositions of Table B may be blended with one of the items listed as Component B on Table C described below.

An embodiment of the invention relates to a thermal spray coating formed by spraying a composition comprising a thermal spray powder material containing particles of a core material mechanically alloyed to a transition metal, the core material being at least one of Aluminum, Titanium, Magnesium or alloys thereof, wherein portions of the core material are alloyed to the transition metal.

An embodiment of the invention relates to a thermal spray powder coating material containing at least one of Aluminum-containing particles, Magnesium-containing particles, and Titanium-containing particles mechanically alloyed to a transition metal.

An embodiment of the invention relates to a thermal spray powder coating material, wherein the Aluminum-containing particles comprise discrete sections of Silicon mechanically alloyed to a transition metal.

An embodiment of the invention relates to a coating material, wherein the transition metal comprises Molybdenum.

An embodiment of the invention relates to a coating material, wherein the transition metal comprises Chromium.

An embodiment of the invention relates to a coating material, wherein the transition metal comprises Molybdenum and Chromium.

An embodiment of the invention relates to a thermal spray powder coating material containing metal-containing particles mechanically alloyed to a transition metal, wherein the metal-containing particles contain at least one of Aluminum, Titanium or Magnesium.

An embodiment of the invention relates to a thermal spray abradable coating obtained from a thermal spray powder material containing Aluminum-containing particles mechanically alloyed to Molybdenum, the thermal spray abradable coating comprising Aluminum alloy portions alloyed to the Molybdenum.

An embodiment of the invention relates to a thermal spray abradable coating, wherein the Aluminum-containing particles each comprise an Aluminum or Aluminum alloy core surrounded by Molybdenum metal mechanically alloyed to the core.

An embodiment of the invention relates to a thermal spray abradable coating, wherein the thermal spray powder material comprises an organic material or an inorganic solid lubricant blended, mixed, or clad with the Aluminum-containing particles.

An embodiment of the invention relates to a thermal spray abradable coating, wherein the Aluminum alloy portions alloyed to Molybdenum are part of an engine component.

An embodiment of the invention relates to a thermal spray abradable coating, wherein the engine component is at least one of: a turbine blade; a piston ring; an engine shroud; an engine cylinder liner; an engine casing; and a bearing.

An embodiment of the invention relates to a thermal spray powder abradable coating material comprising Aluminum-containing particles mechanically alloyed to Molybdenum.

An embodiment of the invention relates to a thermal spray powder abradable coating material, wherein the Aluminum-containing particles each comprise an Aluminum or Aluminum alloy core surrounded by Molybdenum mechanically alloyed to the core.

An embodiment of the invention relates to a thermal spray powder abradable coating material, comprising an organic material or an inorganic solid lubricant blended, mixed, or clad with the Aluminum-containing particles.

An embodiment of the invention relates to a thermal spray powder comprising a mixture, a blend, or a clad of: first particles of polymer; and second particles containing metal and Silicon, wherein an outer surface of the second particles are mechanically alloyed to a transition metal.

An embodiment of the invention relates to a thermal spray powder, wherein the metal comprises at least one of Aluminum, Titanium or Magnesium.

An embodiment of the invention relates to a thermal spray powder, wherein the thermal spray powder comprises a greater weight percentage of the second particles than the first particles.

An embodiment of the invention relates to a thermal spray coating arrangement, comprising: a coating precursor including metal-containing particles mechanically alloyed to a transition metal, the metal-containing particles including at least one of Aluminum, Magnesium, and Titanium; and a thermal spray coating including at least one of: Aluminum metal; a first alloy of Aluminum and the transition metal; Magnesium metal; a second alloy of Magnesium and the transition metal; Titanium metal; and a third alloy Titanium and the transition metal.

An embodiment of the invention relates to a thermal spray coating arrangement, wherein the metal-containing particles each comprise a metal core surrounded by the transition metal mechanically alloyed to the metal core.

An embodiment of the invention relates to a thermal spray coating arrangement, wherein at least one of: the metal-containing particles are blended, mixed, or clad with an organic material; and the metal-containing particles are blended, mixed, or clad with an inorganic solid lubricant.

An embodiment of the invention relates to a thermal spray coating arrangement, wherein the metal core comprises pure Aluminum.

An embodiment of the invention relates to a thermal spray coating arrangement, wherein the metal core comprises an Aluminum alloy.

An embodiment of the invention relates to a thermal spray coating arrangement, wherein the metal core comprises pure Magnesium.

An embodiment of the invention relates to a thermal spray coating arrangement, wherein the metal core comprises a Magnesium alloy.

An embodiment of the invention relates to a thermal spray coating arrangement, wherein the metal core comprises pure Titanium.

An embodiment of the invention relates to a thermal spray coating arrangement, wherein the metal core comprises a Titanium alloy.

An embodiment of the invention relates to a thermal spray coating arrangement, wherein the transition metal comprises at least one of: Molybdenum; Chromium; Zirconium; Titanium; Silicon; and mixtures thereof.

Additional advantages and novel features of these example embodiments will be set forth in part in the description that follows, and in part will become more apparent to those skilled in the art upon examination of the following or upon learning by practice of the embodiments.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the figures.

DETAILED DESCRIPTION OF THE INVENTION

Figure 1:
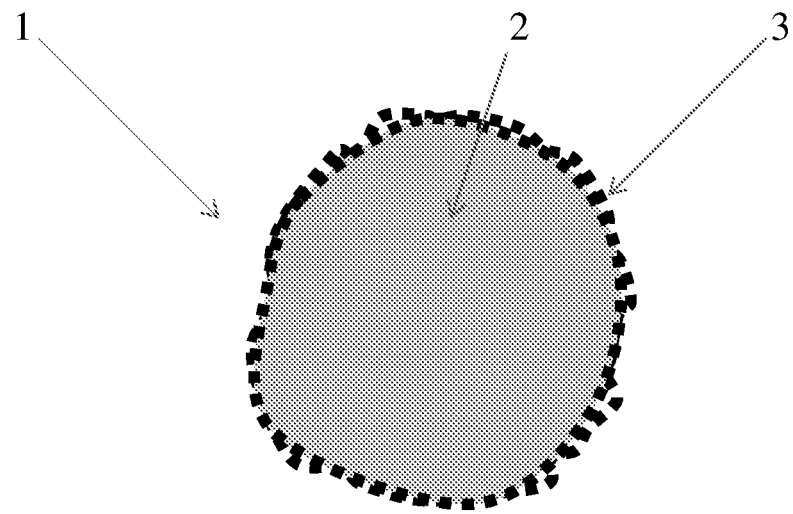
FIG. 1 illustrates an example powder coating particle having an Aluminum core and a transition metal mechanically alloyed to the core, according to example embodiments.

The invention includes a metal-based thermal spray coating with improved sliding and wear properties wherein the coating material is obtained from a mechanically alloyed metallic powder that includes one or more transition metals. A coating method is also disclosed.

Metal-to-metal transfer phenomena may also be observed for Aluminum alloys which are used as the major component of lightweight turbine clearance control coatings (abradables), commonly resulting in unwanted grooving or "gramophoning" effects produced on the shroud materials (abradables) under some turbine rotor incursion conditions. The term "transfer" here means the tendency of Aluminum alloys to adhere and build up on other surfaces, in this case the turbine blades manufactured from Titanium or stainless-steel alloys. Other commonly used engineering terms for transfer are "galling" or "cold welding" or, on a larger and industrially significant scale, "friction welding." Two major factors that promote galling of metals and alloys when in contact with other surfaces are (a) metals & alloys with a high chemical activity and (b) metals & alloys with a low shear modulus & shear strength.

Lower shear strength Aluminum and alloys thereof tend to transfer to higher strength metal surfaces (e.g. Titanium alloy turbine engine blade tips in the case of clearance control with Aluminum). Both Aluminum and Titanium alloys have relatively high chemical activities and oxidize rapidly. Both form protective oxide layers on their surfaces, which tends to inhibit material transfer effects, but the protective oxide layers may be broken up and removed, especially on softer, lower shear strength Aluminum alloys, when the surface undergoes deformation on frictional contact. The breakup of protective oxide layers and other adsorbed gas layers (e.g. water) assists the adhesive transfer (galling) process by exposing the unprotected alloy to high strain rate plastic deformation, friction welding, and mechanical mixing at the contact interface. This has also been demonstrated by observing the friction behavior of metals under high vacuum where the formation and replenishment of oxide layers is inhibited and there are no protective oxides or adsorbed gas layers to prevent transfer and galling phenomena.

In the case of a high-speed rotating turbine rotor blade tip (e.g. 100-400 m/s tip velocity range), once a lump or asperity of transferred Aluminum alloy adheres to the opposing blade tip surface, the lump or asperity may act as an extension of the blade tip and may produce a groove on the opposing abradable surface on the next blade incursion step into the shroud. The result may be a dynamic process of shear deformation and localization of the Aluminum alloy, mechanical mixing, heat generation, oxidation, abrasion, transfer, further grooving and cutting, and removal of the transfer layer once the shear-stresses at the blade tip interface, or within the transfer layer itself, become too high. The resultant steady state mechanism is a complex balance between each of these different mechanisms, that is determined overall by the turbine rotor incursion conditions into the abradable shroud. Low rotor tip speed conditions (e.g. 100-200 m/s) are conducive to transfer phenomena and grooving (gramophoning) where the rate of Aluminum alloy transfer is higher than the rate of Aluminum alloy removal by shear cutting stresses on the tip; the cutting force induced shear stresses being insufficient to break the interface of Aluminum that is friction welded to the blade tip metal.

The undesired effect of grooving and gramophoning phenomena is that it increases both shroud and blade tip surface roughnesses and opens the tip-shroud gap clearances, thereby impacting negatively on turbine sealing efficiency. Subsequent cooling down of turbine blade tips to ambient temperatures after an incursion event or engine cycle commonly results in the transferred Aluminum to break off the tips due to thermal expansion mismatch stresses and relaxation of residual stresses imparted in the transferred Aluminum layers during the heavy deformation processes. This results in even higher sealing efficiency losses. Smoother surfaces for both shroud and blade tip are advantageous for improved sealing efficiency and gas flow aerodynamics.

Inhibiting or reducing the metal-to-metal transfer process may reduce the grooving or gramophoning phenomena discussed above. Various methods can be introduced to inhibit the metal-to-metal transfer process, the most common being by inclusion of solid lubricant materials, such as graphite or hexagonal boron nitride (hBN), or other similar materials into the coating microstructures. These methods are effective in helping to some extent, but are somewhat inefficient at inhibiting or reducing metal-to-metal transfer in that they can be mainly handled as microstructurally large particles, which only partly and inefficiently lubricate and protect the exposed Aluminum alloy matrix. In addition, while solid lubricants, such as graphite and hBN, are well known anti-stick materials, they are also combustible and friable, and tend to inhibit or reduce the formation of metal-to-metal bonding in the thermal spray deposition process, with the result that microstructural control can become difficult.

Other approaches used include the introduction of harder microstructural phases into the Aluminum alloy that help to inhibit the transfer of Aluminum to blade tips, by microabrasive removal of material on the blade tip surfaces. This is commonly done by increasing the Silicon content of the Aluminum alloys from hypoeutectic to near eutectic compositions. Silicon has a hardness of 900-1000HV and is therefore abrasive towards softer materials. However, there are limits to how much Silicon content can be increased due to the risk of having too much abrasion on turbine blades.

A further approach may be to modify the surfaces of Aluminum alloy powder particles by introducing a mechanically stable thin layer on the Aluminum alloy powder particles that is obtained from a material with high lubricity and in turn, helps to inhibit metal-to-metal transfer effects (galling). Accordingly, thin layers of a solid with high lubricity can be deposited onto Aluminum alloys using a number of techniques, such as by physical vapor deposition (PVD), e.g. sputter coating, ion implantation, or laser heating. However, these techniques may not be practical or economically feasible for coating Aluminum alloy particles on a mass production scale.

Another approach is to clad finely milled lubricous material(s) onto Aluminum alloy particles using an organic or inorganic binder. However, the adhesion of the clad layer of fine particles is dependent on the adhesive strength of the binder used which may be weak and affected by higher temperatures. Ideally, if the lubricous material layer could be physically welded or alloyed to the surfaces of the particles, their mechanical stability for both thermal spray handling and flow, spray deposition would be improved, as well as their function as a mechanically stable lubricous layer in, e.g., contact against a turbine blade. One approach is to use mechanical alloying techniques to alloy a thin layer of lubricous material particles to the Aluminum alloy particles. This can be performed using well known lubricous materials such as hexagonal boron nitride (hBN) or graphite, but these materials have low shear strengths and may not weld or alloy to the particle surfaces. Another approach is to mechanically alloy the particle surfaces with a lubricous material that also readily welds to Aluminum alloys. In this respect, Molybdenum metal is a material that stands out in having good lubricity and readily mechanically alloys with Aluminum alloys.

Molybdenum is well known for its lubricity and use in sliding and fretting wear applications to reduce friction in the coatings of many engineering systems such as, e.g., an automotive engine component such as, e.g., a turbine blade, a piston ring, an engine shroud, an engine cylinder liner, an engine casing, and a bearing. Molybdenum is recognized as having good wear properties imparted by a high hardness.

The hardness of pure Molybdenum in the bulk state (sintered from powder) of approximately 230 HV is relatively soft for a "highly wear resistant" material. However, the wear resistance of Molybdenum-based coatings can be further improved when blending pure Molybdenum with bronze and/or Al-12Si powder and/or mixtures thereof. When Molybdenum is sprayed as a coating (e.g. wire arc, HVOF, or plasma) Molybdenum tends to partly oxidize, with the result that oxygen and oxide inclusions can harden it significantly to easily produce hardnesses in the range of 600-950HV, thereby imparting improved wear resistance.

The low hardness in the purer, low oxygen content state and inherent brittleness, such as for refractory metals, make such Molybdenum ideal for mechanical milling to substantially fine submicron powders without the need for high energy input. Alloying of elemental Aluminum and Molybdenum using high energy milling and followed by consolidation treatments such as compaction and sintering was shown to produce corrosion resistant supersaturated Aluminum alloys. However, these consolidation treatments to produce bulk materials may not preserve the corrosion resistant microstructure developed by high energy ball milling.

Mechanical alloying followed by high frequency induction heat sintering may also be a viable technique to produce nanocrystalline transition metal-containing Aluminum alloys with improved resistance to corrosion in 3.5% NaCl solution. Mechanical alloying of Aluminum with transition metals may include elemental powders mechanically alloyed and consolidated to produce bulk Aluminum alloys with higher strength and improved corrosion and wear resistance.

Radio frequency magnetron sputtering can be used where metal films of alloyed Aluminum and Molybdenum with different Molybdenum content have been produced. By immersing the produced Al—Mo alloyed metal films in a chloride solution, the alloying with Molybdenum has the effect to catalyze the cathodic half-reaction and produce a rapid increase in the corrosion potential driving the critical pitting potential to more electropositive.

The increased corrosion resistance of Aluminum-Molybdenum alloys was also explained by the higher corrosion potential for alloys produced using electrodeposition. Other studies have shown that Aluminum alloys containing transition metals (e.g. cobalt and Molybdenum) and rare earth (e.g. cerium) metal alloys exhibited increased corrosion resistance due to the release of Ce, Co, and/or Mo ions acting as corrosion inhibitors.

One form of coating deposited by thermal spraying is a corrosion resistant abradable Aluminum alloy includes a thermally sprayed Aluminum alloy coating where rare earth and transition metals are incorporated to the coating by infiltration and/or by using an atmospheric plasma co-spraying method.

FIG. 1 illustrates an example powder coating particle 1 having an Aluminum, Magnesium, or Titanium core 2, and a transition metal 3 mechanically alloyed to the core 2, according to embodiments. An example embodiment of the invention is an abradable thermal spray coating powder obtained from powder particles 1 of the type shown in FIG. 1 and which exhibits improved cutting performance, and that reduces or eliminates wear damage on components such as Titanium alloy compressor blades such as in the compressor section of aero-engine or land-based gas or steam turbine, and steel-based compressor blades such as in the compressor section of aero-engine or land-based gas or steam turbine.

Abradable seals may benefit from the coating according to example embodiments. Such seals may be used in turbo machinery to reduce the clearance between rotating components, such as blades and labyrinth seal knife edges, and the engine casing. Reducing the clearance improves the turbine engine's efficiency and reduces fuel consumption by allowing designers to reduce clearance safety margins by reducing or eliminating the possibility of a catastrophic blade/case rub. The compressor seal is produced by applying an abradable coating to the stationary part of the engine with the rotating part (blade, knife) rubbing against the coating.

By using the powder material shown in FIG. 1 to form an abradable coating on the above-noted components, galling as well as the propensity for so-called blade pick-up are reduced.

Another advantage of the above example embodiments is improved corrosion performance. As was noted above, Aluminum alloy-based abradable coatings may be susceptible to general corrosion, cyclic corrosion (white hydroxide generation), blistering corrosion, as well as stress-corrosion cracking damages, especially in sea salt moisture environments. However, in example embodiments, Aluminum alloy-based abradable coatings obtained using mechanically alloyed transition metals (e.g. Molybdenum and/or Chromium) exhibit improved corrosion resistance, which is an additional benefit. Similarly, Magnesium alloy-based coatings and Titanium-based coatings according to the above discussed example embodiments exhibit improved corrosion resistance.

Improvements in wear resistance of the coating according to example embodiments have also been demonstrated in the context of compressor blades, which are subject to damage from corrosion, galling, fretting, and overall sliding wear. Example embodiments provide improved wear resistance for coatings such as: Aluminum-based materials (METCO® 54NS, METCO® 52C-NS, Amdry 355), Titanium-based materials (Pure Titanium and alloys powder available from Oerlikon Metco portfolio), Magnesium-based materials as well as Copper-based materials (DIAMALLOY® 1007, METCO® 445, METCO® 51F-NS, DIAMALLOY® 54, METCO® 57NS, METCO® 58NS). These thermal spray coating materials may be susceptible to wear damage, but the above example embodiments are not as susceptible to wear damage.

Referring again to FIG. 1 and in the example of Aluminum-based particles, the powder particles 1 which may form the thermal spray coating material include an Aluminum core 2 coated with a transition metal 3 such as Mo. The transition metal 3, in the form of much finer or smaller sized particles, is coated onto the core 2 by mechanical alloying. Mechanical alloying may be an efficient and low-cost alloying process that produces a surface layer on powder particles. In the case of Magnesium- or Titanium-based particles, the powder particles 1 form the thermal spray coating material and include a Magnesium, or Titanium core 2 coated with a transition metal 3.

In example embodiments, the alloying of the core 2 and transition metal 3 may be enhanced by employing thermal spray. When the above-noted mechanically alloyed powder material is subjected to thermal spraying, the energy input from plasma spray partially melts and alloys (rapid solidification solution) the metallic particles with the transition metal. This partial alloying is due to the fact that these elements have substantially low solubility in given metallic matrices (e.g. Al) at temperatures below the melting point of Aluminum (e.g. 661° C.) and Aluminum Silicon alloys.

Figure 5:
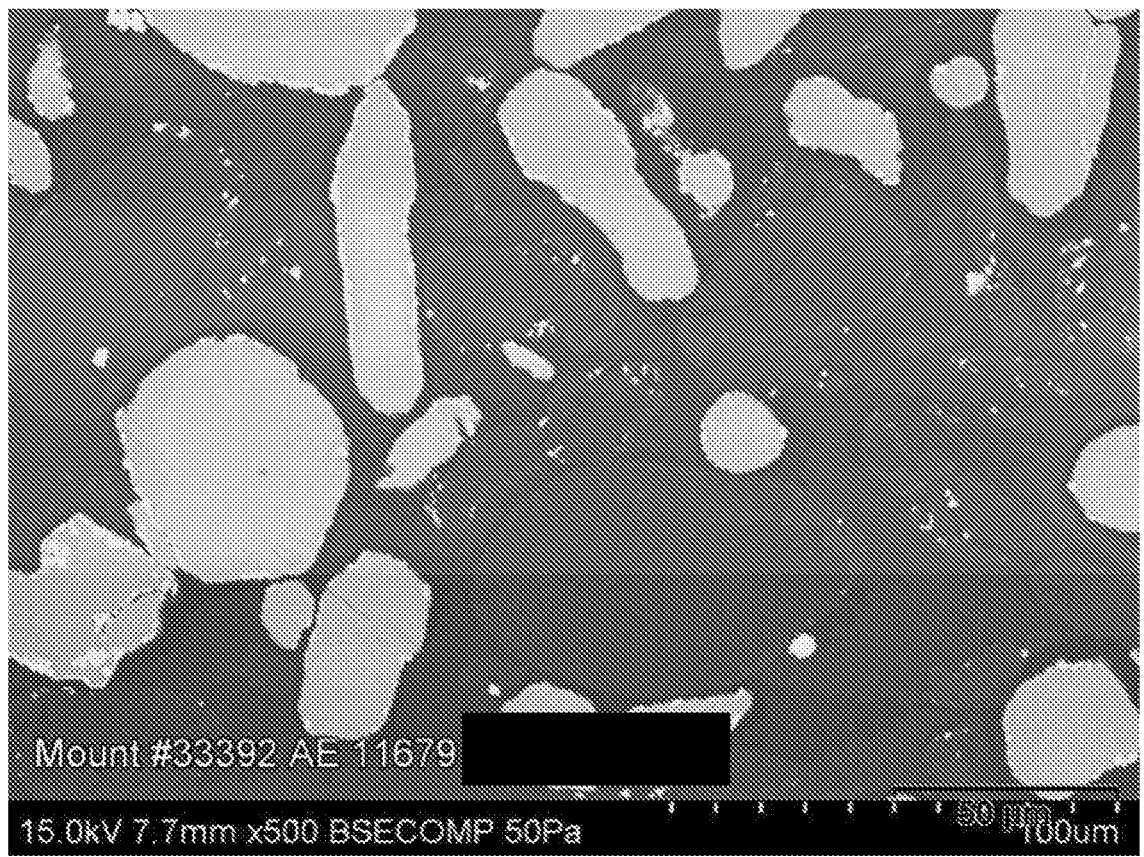
FIG. 5 shows an SEM picture at a first scale of the powder morphology of an Al-12Si alloy core mechanically alloyed with one or more transition metals such as Molybdenum and Chromium and mechanically blended with an organic material, according to example embodiments.
Figure 6:
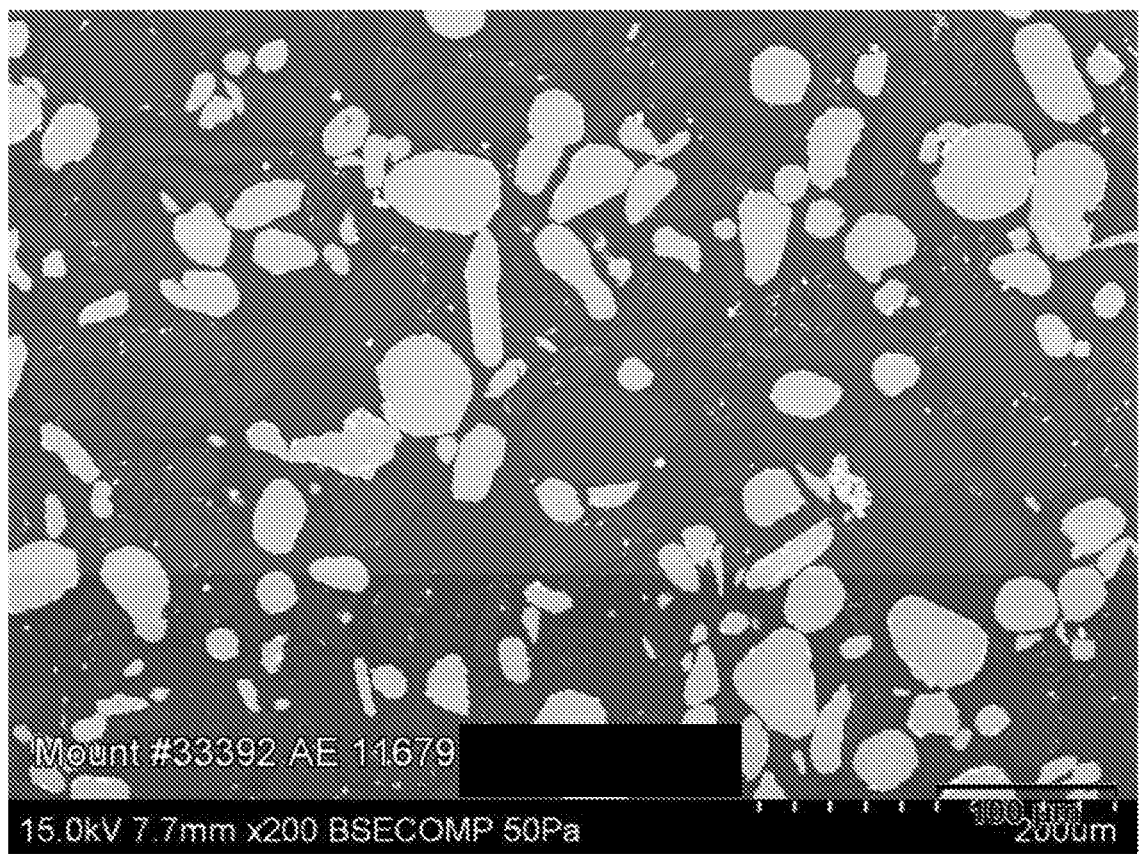
FIG. 6 shows an SEM picture at a second scale of the powder morphology of an Al-12Si alloy core mechanically alloyed with one or more transition metals such as Molybdenum and Chromium and mechanically blended with an organic material, according to example embodiments.

In example embodiments, the coating thus employs a two stage alloying process. In a first stage, fine particles of a transition metal, such as Mo, are mechanically alloyed with the outer surface of the metal particle, such as Al, via a mechanical alloying process, thus resulting in metal particles having a core of metal or metal alloy surrounded by a mechanically alloyed thin outer layer of the transition metal. When such powder particles are subjected to heat, such as from plasma spraying, the energy from the heat melts the metal particle with the thin layer of transition metal. When such particles are deposited as a coating, they form a coating of alloyed portions similar to those shown in FIGS. 5 and 6. Specifically, FIG. 5 illustrates an SEM picture at a first scale of the powder morphology of mechanically alloyed Al-12Si with transition metal(s), and illustrates Aluminum particles surrounded by a transition metal of Molybdenum (lighter shading surrounding particle) and showing polyester particles (darker shading) that are subsequently mechanically blended, and FIG. 6 illustrates an SEM picture at a second scale of the powder morphology of mechanically alloyed Al-12Si with transition metal(s) and illustrates Aluminum particles surrounded by a transition metal of Molybdenum (lighter shading surrounding particle) and showing polyester particles (darker shading).

Because of the low solubility of high melting point transition metals with the significantly lower melting point Aluminum core, the amount of transition elements used to coat the particle cores may be kept as low as practically possible to assist dissolution of the transition metal into the surface of the core particle using the heat energy provided by the thermal spray plasma. For example, the amount of transition elements may be in the range of approximately 0.5 wt % to 2 wt %. Conversely, a high amount of transition elements may be greater than 10 wt %. A transition element layer on the core that is too thick or that includes particles that are too coarse may produce an alloy or composite material that is too hard and abrasive to be useful as an abradable.

Thermal spraying is thus an efficient way to enhance further alloying when mechanically alloyed particles pass through the high temperature plume jet of plasma. In example embodiments, the mechanical alloying is a first stage of alloying of the core 2 and transition metal 3, and the thermal spraying is a second or final stage of alloying of the core 2 and transition metal 3 to produce a solid solution, or a partially supersaturated solid solution.

Figure 2:
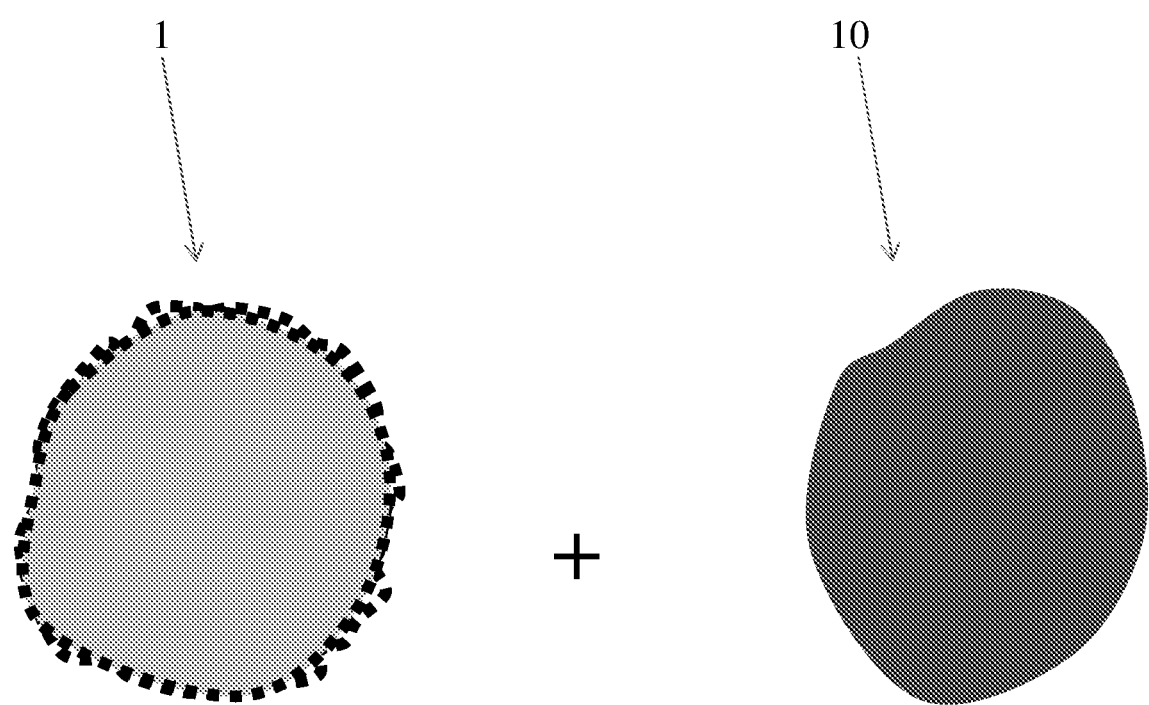
FIG. 2 illustrates a coating material combining or mixing the coating particles of FIG. 1 with particles of a synthetic resin material, according to example embodiments.

FIG. 2 illustrates how a coating material can be obtained by combining or mixing the coating particles of FIG. 1 with particles of a synthetic resin material, according to example embodiments. Referring to FIG. 2, in example embodiments, the particles 1 can be mixed with particles 10 of polymer such as, e.g., polyester, metal clad polyester, aromatic polyester, liquid crystal polyester, methyl methacrylate, or any other organic material capable of being blended or clad with the metal particles. Example weight percentages of this mixture can be about 20 wt % up to 60 wt %, preferably about 30 wt % up to 50 wt % polymer, and a balance of the mechanically alloyed powder. This mixed powder can then be plasma-sprayed on to a substrate to form a coating. Thermal spray produced using the powder types described above exhibit an optimal balance of coating properties such as improved aqueous corrosion resistance, improved solid particle erosion resistance, and improved rub incursion behavior.

Figure 3:
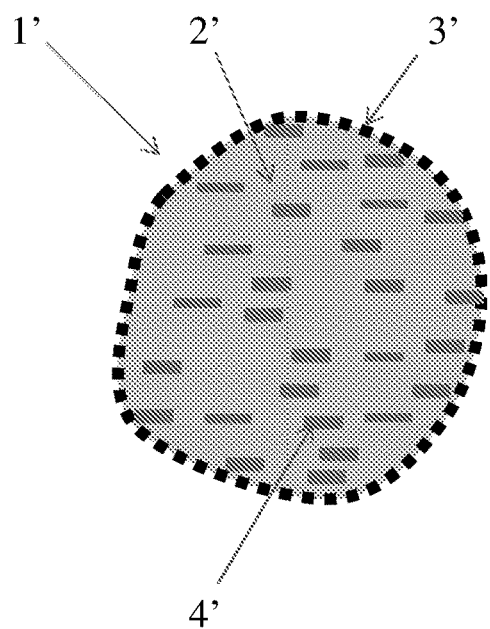
FIG. 3 illustrates an example powder coating particle having a core of Aluminum and Silicon, and a transition metal that is mechanically alloyed to the core, according to example embodiments.

FIG. 3 illustrates an example powder coating particle having a core of Aluminum 2' and Silicon 4' and a transition metal 3' that is mechanically alloyed to the core 2', according to example embodiments. In FIG. 3, the particles 1' which form the thermal spray coating material, may include an Aluminum core 2' having discrete sections of Silicon 4', and the core 2' is coated with a transition metal 3' such as, e.g., Mo. The transition metal 3' may be coated onto the core 2'/4' by mechanical alloying. Mechanical alloying is an efficient and low-cost alloying process that produces a surface layer on powder particles. Silicon can either be formed during a pre-alloying process with pure Aluminum, i.e. via gas atomization, or can be formed by mechanically alloying with a pure Aluminum core.

Figure 4:
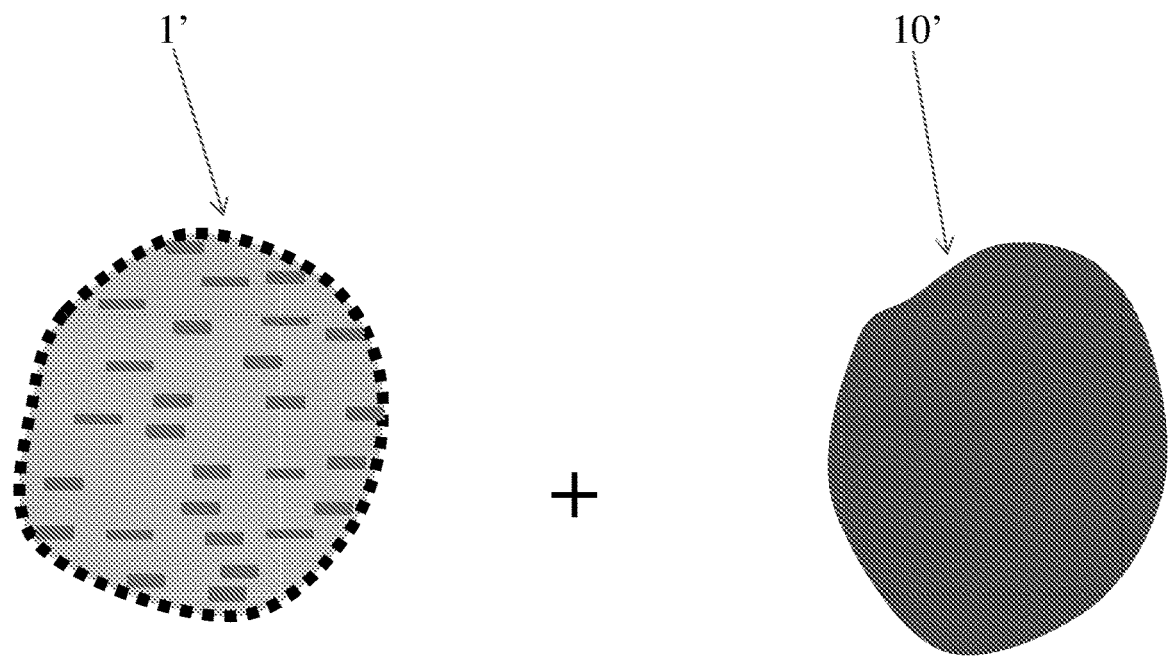
FIG. 4 illustrates a coating material combining or mixing the coating particles of FIG. 3 with particles of a synthetic resin material, according to example embodiments.

FIG. 4 illustrates the combination of mixing of coating particles of FIG. 3 with particles of a synthetic resin material to form a coating material, according to example embodiments. In FIG. 4, the particles 1' can be mixed with particles 10' of polymer such as, e.g., polyester or any other organic material capable of being blended or clad with the metal particles. Non-limiting weight percentages of this mixture can be 20 wt % up to 60 wt %, preferably about 30 wt % up to 50 wt % polymer, and a balance of the mechanically allowed powder that includes Si. Thermal spray produced using the powder types described above exhibit an improved balance of coating properties such as, e.g., improved aqueous corrosion resistance, improved solid particle erosion resistance, and improved rub incursion behavior.

Experiments have been conducted with an Al-12Si based coating powder, having a configuration similar to the configuration described in FIG. 3, which was modified so as to be mechanically alloyed with a Molybdenum-containing solid solution alloy. The presence of Silicon in the Al-12Si allowed Mo to react with Si to form Mo-silicides. The thermal spray coating exhibited improved abradability and corrosion resistance.

Experiments were also carried out in order to study abradable coating powder compositions for low pressure compressor (LPC) section components, i.e., components used in the LPC of a turbine engine. Temperatures observed in the LPC section are in the range of 350° C. maximum but may also exceed this range in the next generation of turbine engines.

The following thermal spray powder materials were analyzed:

Example A—includes 7 weight percent Si, 3 weight percent Mo, 3 weight percent Cr, 40 weight percent Polymer, and a balance of Al.

Example B—includes 6 weight percent Si, 2.7 weight percent Mo, 2.7 weight percent Cr, 46 weight percent Polymer, and a balance of Al.

Example C—includes 7 weight percent Si, 6 weight percent Mo, 40 weight percent Polymer, and a balance of Al.

Example D—includes 7 weight percent Si, 1 weight percent Mo, 1 weight percent Cr, 40 weight percent Polymer, and a balance of Al.

The above-discussed experimental powders were prepared using a mechanical alloying (ball milling) machine. An Aluminum Silicon alloy atomized powder was milled with one or more transition metals, or mixture thereof. The transition metals (Molybdenum and Chromium) had a fisher sub sieve sizer (FSSS) particle size less than 10 μm.

Examples A-D were then compared to different materials such as Metco 601NS: Al 7Si 40 Polyester, Metco 320NS: Al 10Si 20hBN and Metco 52C-NS: Al-12Si.

Examples A-D were used to form abradable coatings as follows. The abradable powders A-D were deposited on a bond coat layer of Metco 450NS (NiAl) after the bond coat was applied to either a stainless steel (17-4PH) or Titanium alloy substrate. All bond coats were sprayed to a thickness of between 150 and 200 μm and each topcoat of abradable coating was sprayed to a total coating thickness of 2.0 mm and subsequently milled down. All tests were performed on the milled surface and no further surface preparation was performed. For each powder type, some coupons were prepared for hardness, metallography, erosion, bond strength and incursion (abradability) testing.

The different tests conducted on the example coatings A-D were compared to the above-described Metco products and were found to produce coatings with improved properties compared to the above-described Metco products. These properties included improved abradability (reduced galling and blade pick-up as well as no Titanium alloy blade wear) and corrosion resistance (NaCl wet corrosion environment). Additional details are discussed in Table A presented below.

The results of such experiments demonstrate that the mechanical alloying of transition metals with metal-based alloy powder increases the solubility of these elements into different metallic matrices (e.g. Aluminum, Magnesium, or Titanium). Thermal spraying of such alloyed powder enhances alloying and solubility further leading to improved sliding and overall wear and corrosion properties. These improvements were demonstrated for Aluminum-based abradable coatings where the cutting performance of such coatings when rubbed by Titanium alloy compressor blades was found to be significantly improved to the cutting performance of existing Aluminum-based abradable coatings. Use of metallic abradable coatings obtained from transition metal-containing mechanically alloyed powder was also found to reduce the galling behavior of the inventive abradable coatings and reduce the propensity to so-called blade pick-up. Another demonstrated benefit is improved corrosion performance of Aluminum alloy-based abradable coatings which are normally susceptible to general corrosion (white Aluminum hydroxide generation), cyclic corrosion, blistering corrosion as well as stress-corrosion cracking damages, especially in sea salt moisture environments. It was demonstrated that Aluminum-alloy based abradable coatings obtained using mechanically alloyed transition metals (e.g. Molybdenum and Chromium) containing Aluminum alloy powder exhibit significantly improved corrosion resistance.

Example A

Referring to FIGS. 3 and 4, a powder coating material obtained from metal particles 1' and polymer particles 10' with particles 1' is blended with particles 10'. Particles 1' have a core 2' of 7 weight percent Si (Si portions 4') and a balance of Al. The transition metal 3' has 3 weight percent Mo and 3 weight percent Cr. The particles 10' constitute 40 weight percent polymer. The particles 1' have a size that ranges between 11 µm and 150 µm. The particles 10' have a size that ranges between 45 µm and 150 µm.

Example B

A powder coating material obtained from particles 1' blended with particles 10' wherein the particles 1' have a core 2' of 6 weight percent Si (Si portions 4') and a balance of Al. The transition metal 3' has 2.7 weight percent Mo and 2.7 weight percent Cr. The particles 10' constitute 46 weight percent polymer. The particles 1' have a size that ranges between 11 µm and 150 µm. The particles 10' have a size that ranges between 45 µm and 150 µm.

Example C

A powder coating material obtained from particles 1' blended with particles 10' wherein the particles 1' have a core 2' of 7 weight percent Si (Si portions 4') and a balance of Al. The transition metal 3' has 6 weight percent Mo. The particles 10' constitute 40 weight percent polymer. The particles 1' have a size that ranges between 11 µm and 150 µm. The particles 10' have a size that ranges between 45 µm and 150 µm.

Example D

A powder coating material obtained from particles 1' blended with particles 10' wherein the particles 1' have a core 2' of 7 weight percent Si (Si portions 4') and a balance of Al. The transition metal 3' has 1 weight percent Mo and 1 weight percent Cr. The particles 10' constitute 40 weight percent polymer. The particles 1' have a size that ranges between 11 µm and 150 µm. The particles 10' have a size that ranges between 45 µm and 150 µm.

TABLE A

| Thermally sprayed abradable coating composition | Incursion performance Incursion vs Titanium alloy blades at set incursion conditions* | General Corrosion resistance 200 hours immersion in 5 wt. % aqueous NaCl solution at 40° C. | Blistering Corrosion resistance 200 hours immersion in 5 wt. % aqueous NaCl solution at 40° C. |
|---|---|---|---|
| Al12Si + 40 wt. % aromatic polyesters | Presence of adhesive transfer of shroud material to blade tips and grooving in shroud wear track Average over-penetration*: 39% | white aluminium hydroxide corrosion product formation | Blistering and delamination cracking of coating present |
| Examples A, B, C and D AlSi—Mo or AlSi—Mo—Cr + 40 wt. % aromatic polyester | Reduced adhesive transfer of shroud material to blades and reduced grooving in shroud wear track. Average over-penetration*: 22% | No corrosion product (aluminium hydroxide) formation | No blistering or delamination present |

*Incursion conditions: 200 m/s blade tip velocity, 150 micron/s incursion rate, room temperature. (0.7 mm blade tip width)

Additional Examples

A powder coating material obtained from particles 1' blended with particles 10' wherein the particles 1' have a core 2' of 7 weight percent Si (Si portions 4') and a balance of Al. The transition metal 3' has 1 weight percent Mo and 1 weight percent Cr. The particles 10' constitute 40 weight percent spray dried agglomerated metal. The particles 1' have a size that ranges between 11 µm and 150 µm. The particles 10' have a size that ranges between 45 µm and 150 µm.

A powder coating material obtained from particles 1' wherein the particles 1' have a core 2' of 5 weight percent Zn and a balance of Mg. The transition metal 3' has 10 weight percent Mo. The particles 1' have a size that ranges between 11 μm and 150 μm.

A powder coating material obtained from particles 1' wherein the particles 1' have a core 2' of 4 weight percent Al, 3 weight percent V and a balance of Ti. The transition metal 3' has 30 weight percent Mo. The particles 1' have a size that ranges between 11 μm and 150 μm.

A powder coating material obtained from particles 1' wherein the particles 1' have a core 2' of 3 weight percent (wt. %) Al, 2 weight percent Zr, 1 weight percent Sn, 1 weight percent Mo and a balance of Ti. The transition metal 3' has 25 weight percent Mo and 25 weight percent Cr. The particles 1' have a size that ranges between 11 μm and 150 μm.

Transition elements: elements of groups IV-XI of the periodic table and may include ferromolybdenum.

Al alloys: Al-12Si, Al6Si

Transition metals sizes: less than 20 μm, preferably less than 10 μm, more preferably less than 5 μm. In coating form, Component A acts as the primary matrix alloy and corresponds to the metallic coating skeleton. This primary matrix alloy ensures the coating mechanical integrity and associated thermal cycling resistance.

TABLE C

| Mechanical Blend with Component B | |
|---|---|
| Component B | |
| Type | Concentration (wt. %) |
| Polyester | 60 |
| Polyester | 40 |

TABLE B

| Mechanically alloyed Component A | | | | | |
|---|---|---|---|---|---|
| Powder 1 | | Powder 2 | | Powder 3 | |
| Type | Concentration (wt. %) | Type | Concentration (wt. %) | Type | Concentration (wt. %) |
| Al alloys | 50 | Transition Metal 1 | 50 | — | 0 |
| Al alloys | 70 | Transition Metal 1 | 30 | — | 0 |
| Al alloys | 90 | Transition Metal 1 | 10 | — | 0 |
| Al alloys | 98 | Transition Metal 1 | 2 | — | 0 |
| Al alloys | 50 | Transition Metal 1 | 25 | Transition Metal 2 | 25 |
| Al alloys | 70 | Transition Metal 1 | 15 | Transition Metal 2 | 15 |
| Al alloys | 90 | Transition Metal 1 | 5 | Transition Metal 2 | 5 |
| Al alloys | 98 | Transition Metal 1 | 1 | Transition Metal 2 | 1 |
| Mg alloys | 50 | Transition Metal 1 | 50 | — | 0 |
| Mg alloys | 70 | Transition Metal 1 | 30 | — | 0 |
| Mg alloys | 90 | Transition Metal 1 | 10 | — | 0 |
| Mg alloys | 98 | Transition Metal 1 | 2 | — | 0 |
| Mg alloys | 50 | Transition Metal 1 | 25 | Transition Metal 2 | 25 |
| Mg alloys | 70 | Transition Metal 1 | 15 | Transition Metal 2 | 15 |
| Mg alloys | 90 | Transition Metal 1 | 5 | Transition Metal 2 | 5 |
| Mg alloys | 98 | Transition Metal 1 | 1 | Transition Metal 2 | 1 |
| Ti alloys | 50 | Transition Metal 1 | 50 | — | 0 |
| Ti alloys | 70 | Transition Metal 1 | 30 | — | 0 |
| Ti alloys | 90 | Transition Metal 1 | 10 | — | 0 |
| Ti alloys | 98 | Transition Metal 1 | 2 | — | 0 |
| Ti alloys | 50 | Transition Metal 1 | 25 | Transition Metal 2 | 25 |
| Ti alloys | 70 | Transition Metal 1 | 15 | Transition Metal 2 | 15 |
| Ti alloys | 90 | Transition Metal 1 | 5 | Transition Metal 2 | 5 |
| Ti alloys | 98 | Transition Metal 1 | 1 | Transition Metal 2 | 1 |

TABLE C-continued

Mechanical Blend with Component B

| Component B | |
|---|---|
| Type | Concentration (wt. %) |
| Polyester | 20 |
| Polyester | 0 |
| Metal clad polyester | 60 |
| Metal clad polyester | 40 |
| Metal clad polyester | 20 |
| Metal clad polyester | 0 |
| Solid lubricant | 60 |
| Solid lubricant | 40 |
| Solid lubricant | 20 |
| Solid lubricant | 0 |
| Metal clad solid lubricant | 60 |
| Metal clad solid lubricant | 40 |
| Metal clad solid lubricant | 20 |
| Metal clad solid lubricant | 0 |
| Spray dried metal agglomerate | 60 |
| Spray dried metal agglomerate | 40 |
| Spray dried metal agglomerate | 20 |
| Spray dried metal agglomerate | 0 |
| Mechanically alloyed metal | 60 |
| Mechanically alloyed metal | 40 |
| Mechanically alloyed metal | 20 |
| Mechanically alloyed metal | 0 |

In the coating, the function of component B described above is to be easily cut by turbomachinery blades and therefore act as a "pseudo-porosity" or a friable "dislocator" due to the weakness of the material corresponding to component B compared to the primary matrix material corresponding to component A.

In example embodiments, the powders produce coatings with improved rub characteristics, i.e., they can provide an improved balance, such as, e.g., an optimal balance, between the desired properties of abradability, erosion resistance, and hardness. They meet current gas turbine Original Equipment Manufacturer (OEM) specifications for clearance control coatings. Such coatings obtained from the powder material that include components A and B of Tables B and C may be applied using an atmospheric plasma spray process. Uses and applications include lightweight clearance control coatings for aerospace turbine engine low pressure compressor, automotive and industrial turbochargers. Abradable coatings can be used against untipped Titanium alloy and nickel alloy and steel blades at service temperatures up to 325° C. (615° F.) and can also be used against untipped Aluminum alloy radial impeller blading. They can have an irregular, rounded morphology and include one or more of the features/properties of Metco 601NS or Metco 1602A which are herein incorporated by reference in their entireties.

Other Examples/Uses

A gas-atomized near-eutectic Aluminum Silicon powder is mechanically alloyed with submicron fine pure Molybdenum and pure Chromium powder by way of an alloying process wherein Molybdenum and Chromium layers are mechanically alloyed onto powder surfaces. This composition is used to manufacturing a wire, and the wire is subjected to thermal spraying using a wire spraying (arc or combustion) process. This coating can be used as an abradable coating and/or as a corrosion resistant Aluminum alloy coating.

In example embodiments, at least because the invention is disclosed herein in a mariner that enables one to make and use it, by virtue of the disclosure of particular example embodiments, such as for simplicity or efficiency, for example, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an example embodiment, it is understood that the words which have been used herein are words of description and illustration, rather than words of limitation. Changes may be obtained, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The following is a list of publications that are incorporated herein by reference in their entirety:

Buckley, Donald H., Journal of Colloid and Interface Science, 58 (1), p. 36-53, Jan 1977 "The metal-to-metal interface and its effect on adhesion and friction."

Buckley, Donald H., Thin Solid Films, 53 (3), p. 271-283, September 1978 "Tribological properties of surfaces."

Miyoshi, Kazuhisa; Buckley, Donald H., Wear, 82 (2), p. 197-211, November 1982 "Tribological properties of Silicon carbide in the metal removal process."

Miyoshi, Kazuhisa; Buckley, Donald H, Wear, 77, Issue 2, April 1982, Pages 253-264 "Adhesion and friction of transition metals in contact with non-metallic hard materials."

S. Wilson; The Future of Gas Turbine Technology, 6th International Conference, 17-18 Oct. 2012, Brussels, Belgium, Paper ID Number 51 "Thermally sprayed abradable coating technology for sealing in gas turbines."

R. J. Rodriguez, A. Sanz; A. Medrano, Ja. Garcia-Lorente Vacuum Volume 52, Issues 1-2, 1 Jan. 1999, Pages 187-192 "Tribological properties of ion implanted Aluminum alloys."

J. R. Davis Handbook of Thermal Spray Technology ASM International, 2004, P157 "Material Production Techniques for Producing Unique Geometries of Compositions."

M. Zdujic, D. Poleti; Lj. Karanovic; K. F. Kobayashi; P. H. Shingu, Materials Science and engineering, A185 (1994) 77-86 "Intermetallic phases produced by the heat treatment of mechanically alloyed Al—Mo powders."

V. Anand, S. Sampath, C. D. Davis, D. L. Houck U.S. Pat. No. 5,063,021, "Method for preparing powders of nickel alloy and Molybdenum for thermal spray coatings."

M. Laribi, A. B. Vannes, D. Treheux Wear Volume 262, Issues 11-12, 10 May 2007, Pages 1330-1336 "Study of mechanical behavior of Molybdenum coating using sliding wear and impact tests."

T. S. Srivatsan, B. G. Ravi, A. S. Naruka, L. Riester, M. Petraroli, T. S. Sudarshan, Powder Technology 114, 2001. 136-144 "The microstructure and hardness of Molybdenum powders consolidated by plasma pressure compaction."

J. Ahn, B. Hwang, S. Lee, Journal of Thermal Spray Technology, Volume 14(2) June 2005-251 "Improvement of Wear Resistance of Plasma-Sprayed Molybdenum Blend Coatings."

S. Tailor, A. Modi, S. C. Modi, J Therm Spray Tech, April 2018, Volume 27, Issue 4, pp 757-768, "High-Performance Molybdenum Coating by Wire—HVOF Thermal Spray Process."

M. Zdujic, D. Poleti, Lj. Karanovic, K. F. Kobayashi, P. H. Shingu Materials Science and engineering, A185 (1994) 77-86 "Intermetallic phases produced by the heat treatment of mechanically alloyed Al—Mo powders."

W. C. Rodriguesa, F. R. Mallqui Espinoza, L. Schaeffer, G. Knörnschild, Materials Research, Vol. 12, No. 2, 211-218, 2009 "A Study of Al—Mo Powder Processing as a Possible Way to Corrosion Resistant Aluminum-Alloys."

A. H. Seikh, M. Baig, H. R. Ammar, M. Asif Alam "The influence of transition metals addition on the corrosion resistance of nanocrystalline Al alloys produced by mechanical alloying."

W. C. Moshier, G. D. Davis, J. S. Ahearn, H. F. Hough "Corrosion Behavior of Aluminum-Molybdenum Alloys in Chloride Solutions."

T. Tsuda, C. L. Hussey, G. R. Stafford 2004 The Electrochemical Society "Electrodeposition of Al-Mo Alloys from the Lewis Acidic Aluminum Chloride-1-ethyl-3-methylimidazolium Chloride Molten Salt."

M. A. Jakab, J. R. Scully "Cerium, Cobalt and Molybdate Cation Storage States, Release and Corrosion Inhibition when delivered from Al-Transition Metal-Rare Earth Metal Alloys."

C. W. Strock; M. R. Jaworoski; F. W. Mase, U.S. Publication No. 2016/0251975A1 "Aluminum alloy coating with rare earth and transition metal corrosion inhibitors."

What is claimed is:

1. A thermal spray coating, comprising:
   metal-containing particles mechanically alloyed to a transition metal by repeated cold welding, fracturing and re-welding, the metal-containing particles each comprising a core of at least one of Aluminum, Magnesium, and Titanium,
   wherein the cores are surrounded by the transition metal that is mechanically alloyed to the core by repeated cold welding, fracturing and re-welding, and
   wherein the thermal spray coating is formed by spraying a composition comprising at least one of:
      organic material blended, mixed, or clad with the metal-containing particles; or
      inorganic solid lubricant blended, mixed, or clad with the metal-containing particles.

2. The thermal spray coating of claim 1, wherein the metal-containing particles comprise a core of one of: pure Aluminum, Aluminum alloy, pure Magnesium, Magnesium alloy, pure Titanium, Titanium alloy.

3. The thermal spray coating of claim 1, wherein the transition metal comprises at least one of:
   Molybdenum;
   Chromium;
   Zirconium;
   Titanium;
   Silicon; or
   mixtures thereof.

4. The thermal spray coating of claim 1, wherein the alloyed transition metal has a particle size that is less than 50 µm.

5. A thermal spray powder comprising:
   metal-containing particles mechanically alloyed to a transition metal by repeated cold welding, fracturing and re-welding, the metal-containing particles each comprising a core of at least one of Aluminum, Magnesium, and Titanium,
   wherein the cores are surrounded by the transition metal that is mechanically alloyed to the core by repeated cold welding, fracturing and re-welding, and
   wherein the thermal spray coating is formed by spraying a composition comprising at least one of:
      organic material blended, mixed, or clad with the metal-containing particles; or
      inorganic solid lubricant blended, mixed, or clad with the metal-containing particles.

6. The thermal spray powder of claim 5, further comprising an organic material or inorganic solid lubricant blended, mixed, or clad with the metal-containing particles.

7. The thermal spray powder of claim 5, wherein the transition metal is one of:
   Molybdenum;
   Chromium;
   Zirconium;
   Titanium;
   Silicon; or
   mixtures thereof.

8. The thermal spray powder of claim 5, wherein the transition metal comprises at least one of Molybdenum and Chromium.

9. The thermal spray powder of claim 5, wherein the mechanically alloyed transition metal has a particle size that is less than 10 µm.

10. The thermal spray powder of claim 5, wherein the metal-containing particles are at least one of:
    blended with 20 to 70 weight percent organic material; or
    clad with 20 to 70 weight percent organic material.

11. The thermal spray powder of claim 5, wherein the metal-containing particles are at least one of:
    blended with 30 to 50 weight percent organic material; or
    clad with 30 to 50 weight percent organic material.

12. The thermal spray powder of claim 10, wherein the organic material comprises at least one of:
    a polyester including at least one of aromatic polyester and liquid crystal polyester;
    a polymer including at least methyl methacrylate; or
    organic solid lubricant.

13. The thermal spray powder of claim 10, wherein the organic material comprises a polymer.

14. The thermal spray powder of claim 5, wherein the metal-containing particles are at least one of:
    blended with 5 to 50 weight percent solid lubricant; or
    clad with 5 to 50 weight percent solid lubricant.

15. The thermal spray powder of claim 5, wherein the metal-containing particles are at least one of:
    blended with 15 to 25 weight percent solid lubricant; or
    clad with 15 to 25 weight percent solid lubricant.

16. The thermal spray powder of claim 14, wherein the solid lubricant is at least one of:
hexagonal boron nitride;
calcium fluoride;
Graphite;
Talc; or
Molybdenum disulfide.

17. A method of coating a substrate with the thermal spray powder of claim 5, the method comprising:
thermal spraying the thermal spray powder onto the substrate,
wherein thermal spraying comprises one of:
plasma spraying;
high velocity oxy fuel (HVOF) spraying;
combustion spraying; or
arc wire spraying.

18. A method of making a thermal spray powder including at least one of Aluminum-containing particles, Magnesium-containing particles, and Titanium-containing particles, the method comprising:
mechanically alloying a transition metal to metallic powder particles containing cores of at least one of Aluminum, Magnesium, and Titanium by repeated cold welding, fracturing and re-welding,
wherein the cores are surrounded by the transition metal, which is mechanically alloyed to the cores by repeated cold welding, fracturing and re-welding, and
wherein the thermal spray coating is formed by spraying a composition comprising at least one of:
organic material blended, mixed, or clad with the metal-containing particles; or
inorganic solid lubricant blended, mixed, or clad with the metal-containing particles.

19. The method of claim 18, wherein the transition metal comprises at least one of Molybdenum and Chromium.

20. The method of claim 18, further comprising:
blending or cladding the at least one of Aluminum-containing particles, Magnesium-containing particles, and Titanium-containing particles with an organic material.

21. The method of claim 18, further comprising blending or cladding the at least one of Aluminum-containing particles, Magnesium-containing particles, and Titanium-containing particles with at least one of:
a polyester including at least one of a metal clad polyester, an aromatic polyester, and a liquid crystal polyester;
a polymer including methyl methacrylate;
a solid lubricant including a metal clad solid lubricant; or
a spray dried metal agglomerate.

22. The method of claim 18, further comprising:
blending, mixing, or cladding the at least one of Aluminum-containing particles, Magnesium-containing particles, and Titanium-containing particles with a solid lubricant.

23. The method of claim 18, wherein the mechanically alloying comprises at least one of:
attrition milling;
ball milling; or
cryomilling.

24. The thermal spray coating of claim 1, wherein at least a portion of the Aluminum-containing particles, Magnesium-containing particles, or Titanium-containing particles is not alloyed to the transition metal.

25. The thermal spray powder coating material of claim 1, further comprising powder particles of metal and Silicon mechanically alloyed to the transition metal, wherein the metal comprises at least one of Aluminum, Titanium or Magnesium.

26. The thermal spray powder of claim 9, wherein the particle size of the meahanically alloyed transition metal is between 1 μm and 10 μm.

27. The thermal spray powder of claim 9, wherein the particle size of the mechanically alloyed transition metal is less than 1 μm.

28. The thermal spray coating of claim 1, wherein the alloyed transition metal has a particle size that is less than 10 μm.

* * * * *